(12) United States Patent
Whitby-Streves (10) Patent No.: US 6,618,785 B1
(45) Date of Patent: Sep. 9, 2003

(54) METHOD AND APPARATUS FOR AUTOMATIC DETECTION AND HEALING OF SIGNAL PAIR CROSSOVER ON A HIGH PERFORMANCE SERIAL BUS

(75) Inventor: Colin Whitby-Streves, Bristol (GB)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/557,073

(22) Filed: Apr. 21, 2000

(51) Int. Cl.⁷ .................................................. G06F 3/42

(52) U.S. Cl. .................. 710/305; 710/5; 710/8; 710/10; 710/40; 710/316; 709/220

(58) Field of Search .................. 340/3.53, 825.52; 348/473, 705; 369/13.13, 19; 370/216, 237, 241, 249, 355, 389, 397, 401, 408, 462; 375/257; 379/93.09; 386/96; 700/83; 709/220, 224, 231, 232, 247, 321, 327, 329; 710/10, 100, 104, 105, 107, 119, 124, 40, 5, 8

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 5,014,262 A | 5/1991 | Harshavardhanr | 370/16 |
| 5,274,631 A | 12/1993 | Bhardwaj | 370/60 |
| 5,343,461 A | 8/1994 | Barton et al. | 370/13 |
| 5,394,556 A | 2/1995 | Oprescu | 395/800 |
| 5,452,330 A | 9/1995 | Goldstein | 375/257 |
| 5,490,253 A | 2/1996 | Laha et al. | 395/304 |
| 5,495,481 A | 2/1996 | Duckwall | 370/85.2 |
| 5,539,390 A | 7/1996 | Nagano et al. | 340/825.07 |
| 5,541,670 A | 7/1996 | Hanai | 348/705 |
| 5,568,641 A | 10/1996 | Nelson | 395/700 |
| 5,583,922 A | 12/1996 | Davis et al. | 379/93.09 |
| 5,621,659 A | 4/1997 | Matsumoto et al. | 364/514 R |
| 5,630,173 A | 5/1997 | Oprescu | 395/860 |
| 5,640,595 A | 6/1997 | Baugher et al. | 395/830 |
| 5,684,715 A | 11/1997 | Palmer | 365/514 |
| 5,701,476 A | 12/1997 | Fenger | 395/652 |
| 5,701,492 A | 12/1997 | Wadsworth et al. | 395/712 |
| 5,712,834 A | 1/1998 | Nagano et al. | 369/19 |

(List continued on next page.)

OTHER PUBLICATIONS

"IEEE Standard for a High Performance Serial Bus", IEEE Standard 1394–1995, Institute of Electrical and Electronics Engineers, Inc., Aug. 30, 1996.

"IEEE Standard for a High Performance Serial Bus–Amendment 1", Institute of Electrical and Electronics Engineers, Inc., pp. 1–196, 2000 (no month).

P1394b IEEE Draft Standard for a High Performance Serial Bus (High Speed Supplement), Institute of Electrical and Electronics Engineers, Inc., pp. 1–408, 2002 (no month).

"AV/C Digital Interface Command Set General Specification, Rev. 3.0", 1394 Trade Association, pp. 4–5, 20–34, Apr. 15, 1998.

"Enhancements to the AV/C General Specification 3.0 Version 1.0FC1", 1394 Trade Association, pp. 4, 6–17, Nov. 5, 1998.

"Fibre Channel–Methodologies for Jitter Specification", NCITS TR–25–1999, Jitter Working Group Technical Report, Rev. 10, pp. 1–96, Jun. 9, 1999.

"Information Technology–Microprocessor Systems–Control and Status Registers (CSR) Architecture for Microcomputer Buses", ANSI/IEEE Standard 1212, The Institute of Electrical and Electronics Engineers, Inc. pp. I–122, 1994 Edition.

*Primary Examiner*—Rupal Dharia
(74) *Attorney, Agent, or Firm*—Sierra Patent Group, Ltd.

(57) ABSTRACT

An automatic crossover and healing process is disclosed for the P1394b standard. In particular, a crossover process is disclosed which comprises coupling the transmitting logic of a PHY to TPA, and coupling the receive logic of a PHY to TPB.

6 Claims, 7 Drawing Sheets

Crossover Algorithm
According to the Present Invention

U.S. PATENT DOCUMENTS

| | | | |
|---|---|---|---|
| 5,719,862 A | 2/1998 | Lee et al. ................... 370/355 |
| 5,784,648 A | 7/1998 | Duckwall .................. 395/860 |
| 5,802,048 A | 9/1998 | Duckwall .................. 370/389 |
| 6,311,228 B1 | 10/2001 | Ray ........................... 709/301 |
| 6,345,315 B1 | 2/2002 | Mishra ....................... 709/329 |
| 6,353,868 B1 | 3/2002 | Takayama et al. .......... 710/129 |
| 6,385,679 B1 | 5/2002 | Duckwall et al. ........... 710/119 |
| 5,802,057 A | 9/1998 | Duckwall et al. .......... 370/408 |
| 5,805,073 A | 9/1998 | Nagano et al. ........ 340/825.07 |
| 5,809,331 A | 9/1998 | Staats et al. ................ 395/830 |
| 5,832,298 A | 11/1998 | Sanchez et al. ............ 395/828 |
| 5,835,761 A | 11/1998 | Ishii et al. .................. 395/653 |
| 5,867,730 A | 2/1999 | Leyda ........................ 395/830 |
| 5,875,301 A | 2/1999 | Duckwall et al. ...... 395/200.51 |
| 5,923,663 A * | 7/1999 | Bontemps et al. .......... 370/445 |
| 5,938,764 A | 8/1999 | Klein ............................ 713/1 |
| 5,968,152 A | 10/1999 | Staats ......................... 710/104 |
| 5,970,052 A | 10/1999 | Lo et al. ..................... 370/241 |
| 5,987,605 A | 11/1999 | Hill et al. ....................... 713/2 |
| 6,032,202 A | 2/2000 | Lea et al. ....................... 710/8 |
| 6,038,625 A | 3/2000 | Ogino et al. ................ 710/104 |
| 6,070,187 A | 5/2000 | Subramaniam et al. ..... 709/220 |
| 6,073,206 A | 6/2000 | Piwonka et al. ............ 711/102 |
| 6,115,764 A * | 9/2000 | Chisholm et al. ........... 370/282 |
| 6,122,248 A | 9/2000 | Murakoshi et al. .......... 370/216 |
| 6,131,129 A | 10/2000 | Ludtke ............................ 710/5 |
| 6,133,938 A | 10/2000 | James ............................ 348/8 |
| 6,138,196 A | 10/2000 | Takayama et al. ........... 710/105 |
| 6,141,702 A | 10/2000 | Ludtke et al. ................... 710/5 |
| 6,141,767 A | 10/2000 | Hu et al. ........................ 714/1 |
| 6,157,972 A | 12/2000 | Newman et al. ............. 710/100 |
| 6,160,796 A | 12/2000 | Zou ........................... 370/257 |
| 6,167,532 A | 12/2000 | Wisecup ..................... 713/300 |
| 6,173,327 B1 | 1/2001 | De Borst et al. ............ 709/231 |
| 6,192,189 B1 | 2/2001 | Fujinami et al. ............... 386/96 |
| 6,202,210 B1 | 3/2001 | Ludtke ......................... 723/20 |
| 6,233,615 B1 | 5/2001 | Van Loo ...................... 709/224 |
| 6,233,624 B1 | 5/2001 | Hyder et al. ................. 709/327 |
| 6,247,083 B1 | 6/2001 | Hake et al. .................. 710/107 |
| 6,253,114 B1 | 6/2001 | Takihara ....................... 700/83 |
| 6,253,255 B1 | 6/2001 | Hyder et al. ................. 709/321 |
| 6,260,063 B1 | 7/2001 | Ludtke et al. ............... 709/224 |
| 6,266,334 B1 | 7/2001 | Duckwall ................... 370/397 |
| 6,266,701 B1 | 7/2001 | Sridhar et al. ............... 709/232 |
| 6,282,597 B1 | 8/2001 | Kawamura ................... 710/105 |
| 6,295,479 B1 | 9/2001 | Shima et al. .................. 700/83 |
| 6,308,222 B1 | 10/2001 | Krueger et al. .............. 709/247 |

* cited by examiner

Fig. 1
Prior Art
P1394b Cable

Fig. 2
Prior Art
P1394b Connection

Fig. 3
Prior Art
P1394b Connection

Fig. 4
Prior Art
P1394b Connection

Fig. 5
Crossover Algorithm
According to the Present Invention

Fig. 6
Crossover Algorithm
According to the Present Invention

Fig. 7

METHOD AND APPARATUS FOR AUTOMATIC DETECTION AND HEALING OF SIGNAL PAIR CROSSOVER ON A HIGH PERFORMANCE SERIAL BUS

BACKGROUND OF THE INVENTION

1. Field of the Invention

The present invention relates to data communications. In particular, the present invention relates to automatic detection of signal pair crossover on a high performance serial bus system.

2. The Prior Art

BACKGROUND

The IEEE 1394-1995 standard has revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

However, as technologies improved, the need to update the IEEE 1394-1995 standard became apparent. A new standard is being proposed at the time of the filing of this application, herein referred to as the P1394b standard. Improvements such as higher speeds and longer connection paths will be provided. It is contemplated at the time of this filing that cable lengths of up to 100 meters may be possible using the P1394b standard. Furthermore, the connections between 1394 devices may be established using wiring previously installed in buildings compliant with appropriate regulatory codes.

In the discussion that follows, it will be necessary to distinguish between the various standards that are being proposed as of the date of this application. Additionally, it will be necessary to distinguish hardware and packet transmissions that are compatible with the P1394b standard and not earlier standards.

Thus, the term "Legacy" will be used herein to refer to the IEEE 1394-1995 standard and all supplements thereof prior to the P1394b standard. Thus, for example, a Legacy node refers to a node compatible with the IEEE 1394-1995 standard and all supplements thereof up to, but not including, the P1394b standard.

Furthermore, in the discussion that follows cable physical layers (PHY)s that are compatible with the P1394b standard may be referred to in various ways, depending upon the context the PHY is operating in and the capability of the PHY. For example, a PHY that has circuitry compatible with the P1394b standard but not any previous standards will be referred to as a B only PHY. Also, a PHY that is compatible with both the P1394b standard and all predecessors and is communicating with only devices compatible with the P1394b standard will be referred to as B PHYs. Finally, a PHY that is communicating with both Legacy devices and devices compatible with the P1394b standard will be referred to as a border device, border PHY, or border node. Finally, a communications systems that has only B PHYs attached will be referred to as a B bus.

P1394b Cabling

Figure 1:
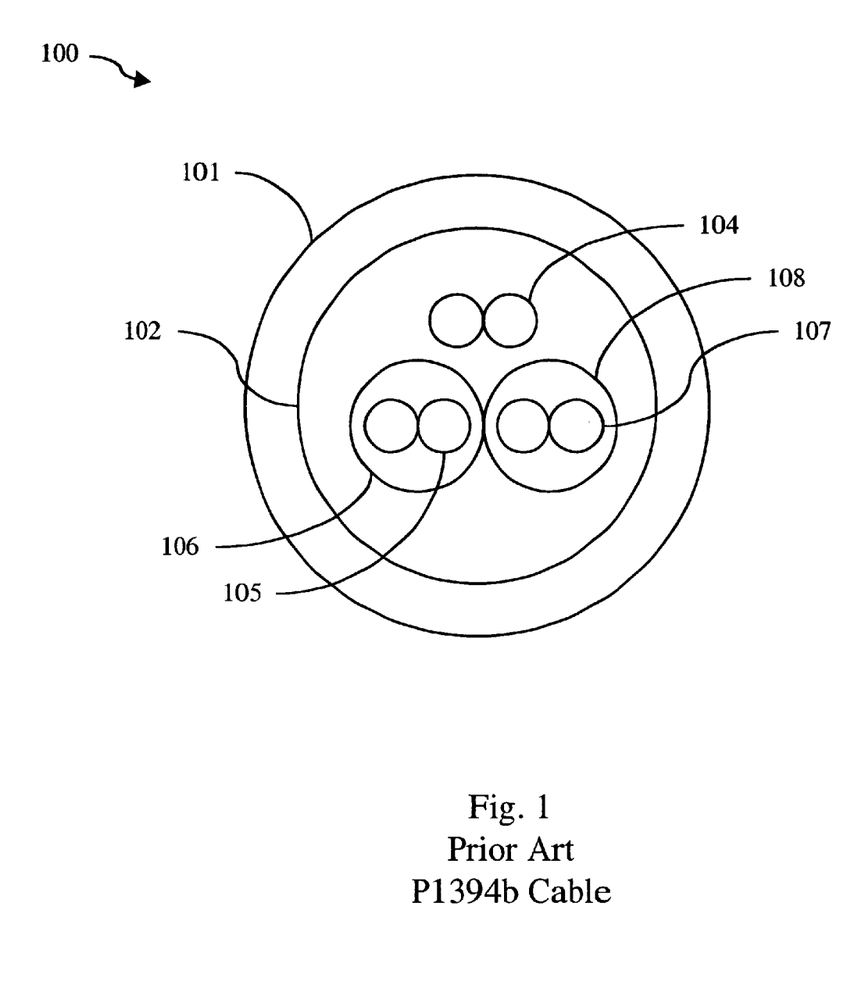
FIG. 1 is a diagram of a prior art P1394b cable.

FIG. 1 shows a prior art diagram of a cable 100 according to the P1394b standard. Cable 100 includes a first signal pair 105 covered by a shield 106, a second signal pair 107 covered by a shield 108, and a power pair 104. The pairs are then enclosed in an outer shield 102, and extruded in an outer jacket 101.

According to the P1394b standard, the first and second signal pairs 105 and 107 form a differential pair, with different information being transmitted through each signal pair. As is appreciated by those of ordinary skill in the art, when a cable is connected to P1394b-compliant device, the device will receive information on a signal pair designated as twisted pair A (TPA), and will transmit on a signal pair designated as twisted pair B (TPB).

Figure 2:
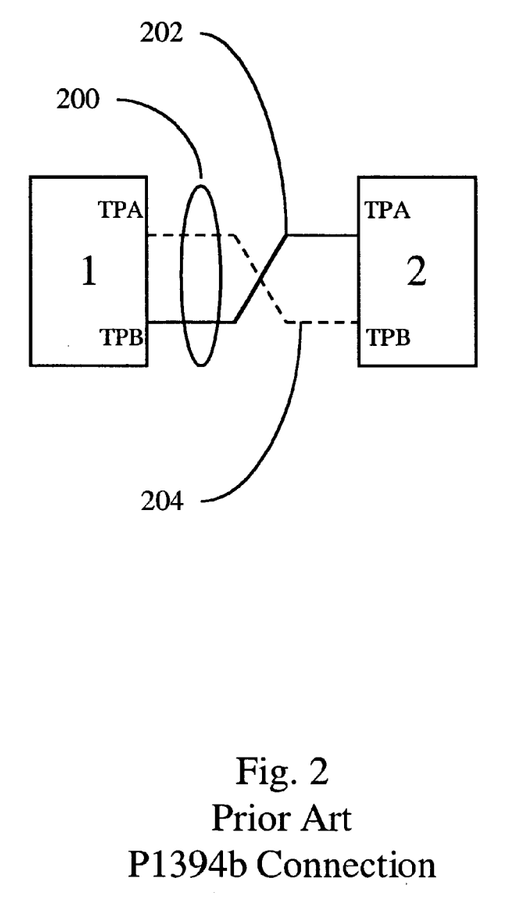
FIG. 2 is a diagram of a prior art P1394b connection.

FIG. 2 shows a diagram of a prior art P1394b connection. FIG. 2 includes a PHY 1 having, and a PHY 2 having a connection point TPA and TPB. Together, a TPA and TPB pair comprise a port. PHYs 1 and 2 are connected via cable 200, which has a first signal pair 202 and a second signal pair 204.

As can be seen by inspection of FIG. 2, because the PHYs transmit and receive on different signal pairs, the first and second signal pairs must be "crossed-over" to properly couple the PHYs. Thus, in FIG. 2, first signal pair 202 is connected to PHY 2's TPB and must be crossed-over to be connected to PHY 1's TPA. The same is true for second signal pair 204. As is appreciated by those of ordinary skill in the art, the signal pair crossover is typically accomplished within the P1394b cabling itself.

In P1394b, a PHY engages in simultaneous transmission and reception called dual simplex. This is different from Legacy, which transmits data on TPB and a "strobe" signal on TPA. Its peer port receives the data on TPA and the strobe on TPB. Legacy operates in "half duplex", whereby previous arbitration determines the direction of the data flow on any given connection. The two connected ports then prime themselves so that one port transmits and one port receives as described above. Because of the strobe signal, Legacy operation requires the use of a crossover, and there is no possibility for operation if the crossover is not provided. To facilitate backwards compatibility, P1394b specifies that the port transmits on TPB and receives on TPA.

Figure 3:
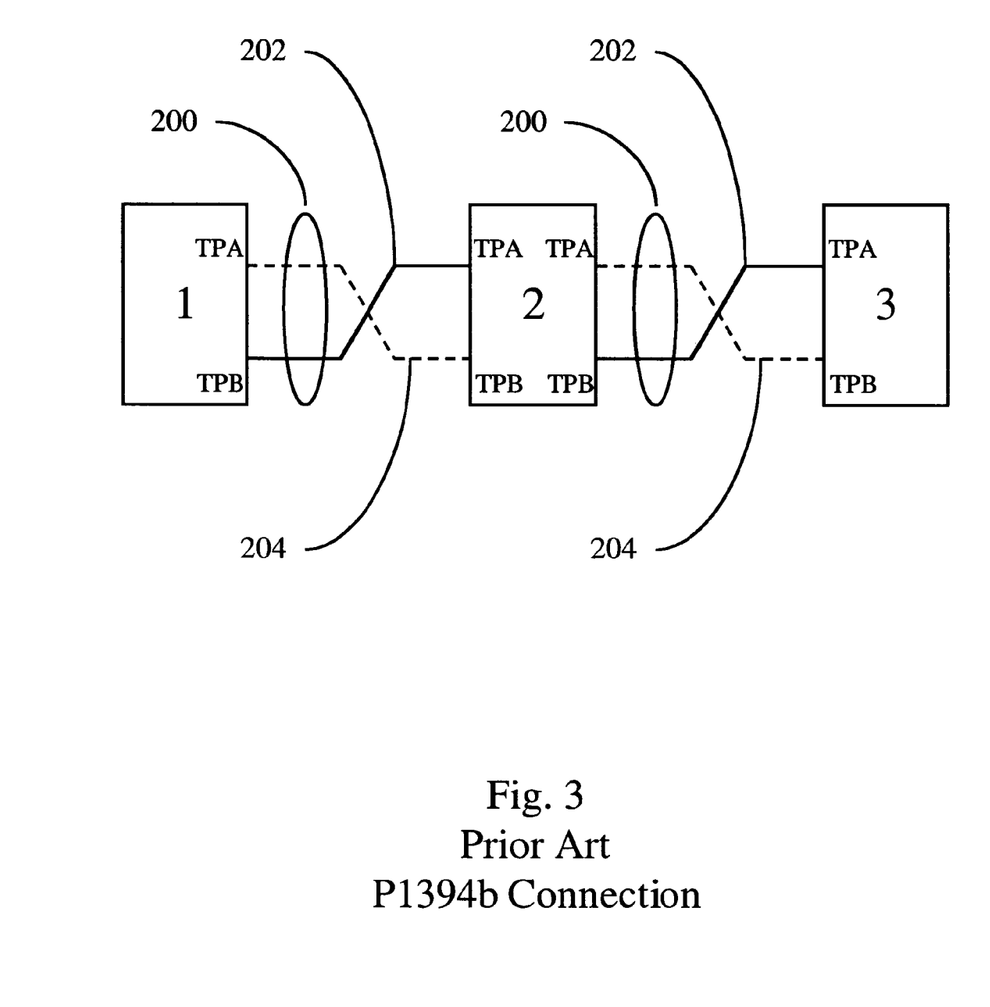
FIG. 3 is a diagram of a prior art P1394b system.

FIG. 3 is a diagram of a prior art P1394b system. Where similar designations are used herein, they are intended to refer to substantially similar matter. FIG. 3 shows what is referred to as a "cluster" of PHYs 1, 2, and 3. The PHYs may represent P1394b-compliant devices such as a computer, video camera, and a mass storage device. In FIG. 3, the PHYs are each connected to each other by a cable 200 in a point-to-point fashion to form the cluster. When devices are connected as in FIG. 3, the crossover normally provided in the cabling is sufficient to provide a proper connection for P1394b devices.

However, one of the advantages of the P1394b standard is the ability to run long lengths of cable (as far as 100 m) and connect P1394b devices throughout a house which has pre-existing wiring, for example. This leads to the problem illustrated in the diagram of FIG. 4.

Figure 4:
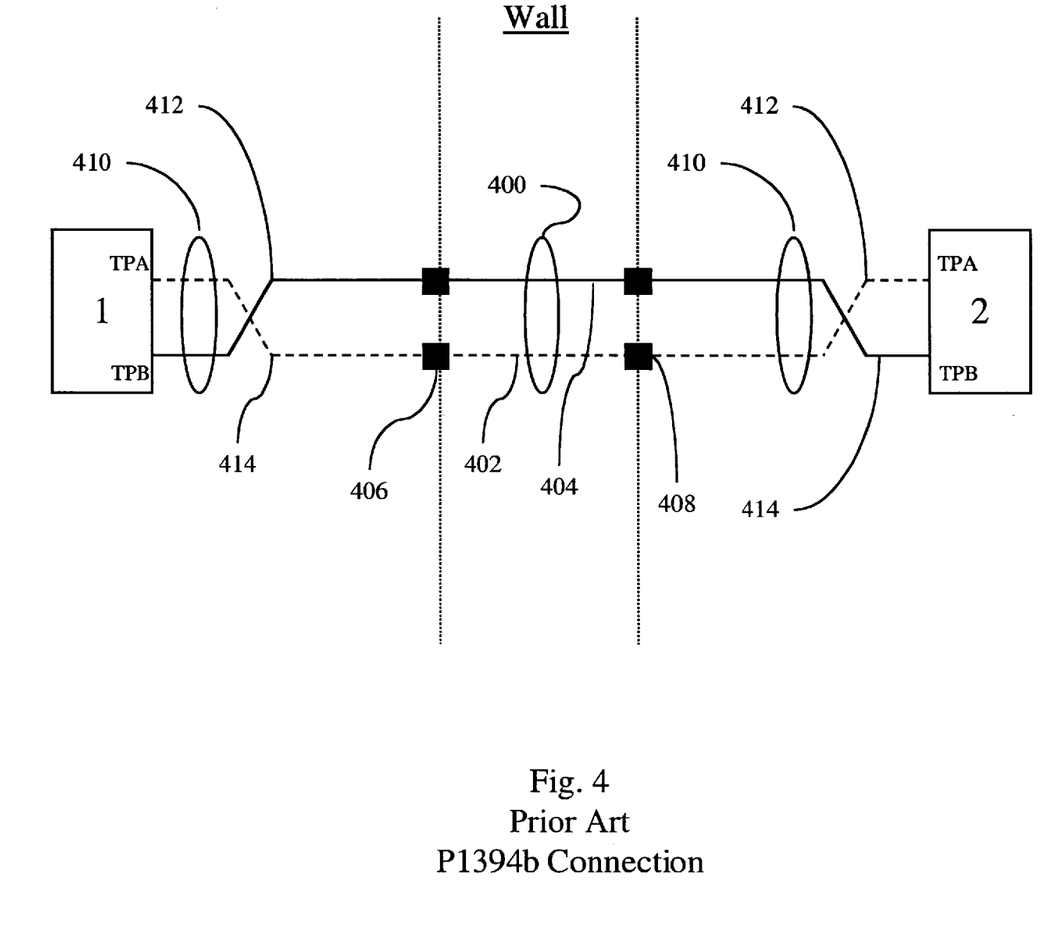
FIG. 4 is a diagram of a prior art P1394b system.

FIG. 4 shows PHY 1 connected to PHY 2, through a wall connection. As is known by those of ordinary skill in the art, when a house is wired for point-to-point connections through a wall, typically wiring is used that will not implement a crossover. FIG. 4 shows such a straight-through wire 400 having conductors 402 and 404 which are not crossed-over internally, and external wall connections pairs 406 and 408.

As can be seen by inspection of FIG. 4, if a user attempts to connect PHY 1 to PHY 2 using a cable such as straight-through cable 400, the TPB1 will be coupled to TPB2 through the wall connection as shown with the solid black conductor, and TPA1 will be coupled to TPA2 as shown with the dashed conductor path. As is appreciated by those of ordinary skill in the art, such a connection will not function properly, and PHY 1 will not communicate properly with PHY 2.

To solve the problem of FIG. 4, two types of patch cords are used which are commonly available. One patch cord implements the crossover and one does not. This solution is tolerable in commercial buildings, where professional network managers ensure that the correct type of cable is used in each circumstance, and also where devices are typically connected semi-permanently.

However, this situation of FIG. 4 leads to frustrating difficulties in the consumer environment, where the subtleties of "cross-over" and "straight-through" patch cables are bewildering.

Furthermore, patch cords have certain drawbacks. For example, patch cords require much trial-and-error to locate and correct the connection that is not crossed-over, causing much user confusion and frustration. Furthermore, in modern homes and businesses which utilize P1394b-compliant devices, often all devices are coupled to a central router through in-wall wiring, making any troubleshooting effort even more difficult.

Hence, there is a need for a method and apparatus for automatically healing a crossover problem in a P1394b-compliant system. Furthermore, there is a need for a method and apparatus for automatically healing a crossover in the P1394b environment without the need for different types of patch cords.

BRIEF DESCRIPTION OF THE INVENTION

The invention satisfies the above needs. The present invention relates to data communications within the P1394b standard. In particular, the present invention relates to automatic detection of signal pair crossover on a high performance serial bus system.

Methods for automatically detecting and healing a crossover are disclosed. A first aspect comprises determining, by the PHY, whether it has received a tone; if the PHY has not received a tone, then examining a random Boolean value; and if the value of the random Boolean value is true, then implementing a crossover process.

A second aspect of the present invention comprises determining, by the PHY, whether it has received a tone; if the PHY has not received a tone, then examining a random Boolean value; if the value of the random Boolean value is true, determining whether the PHY is sending a tone; if the PHY is sending a tone, then waiting a predetermined period of time; further determining whether the PHY has received a tone; and if the PHY has not received a tone, then implementing a crossover process.

A crossover process is disclosed which comprises coupling the transmitting logic of a PHY to TPA, and coupling the receive logic of a PHY to TPB.

An apparatus for automatically detecting a healing a crossover is disclosed, which comprises: a P1394b-complaint port; the port having transmit logic, receive logic, a TPA connection point, and a TPB connection point; a plurality of passgates coupled to the transmit logic, the receive logic, the TPA connection point, and the TPB connection point; a crossover enable signal responsively coupled to the PHY and to the plurality of passgates; and wherein the plurality of passgates are responsive to the crossover enable signal such that when the crossover enable signal is low, the transmit logic is operatively coupled to the TPB connection point, and the receive logic is operatively coupled to the TPA connection point, and when the crossover enable signal is high, the transmit logic is operatively coupled to the TPA connection point, and the receive logic is operatively coupled to the TPB connection point.

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. In particular, the present invention relates to automatic detection of signal pair: crossover on a high performance serial bus system.

The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention relates to data structures and the transmission of such data structures. It is contemplated that the present invention may by embodied in various computer and machine readable data structure. Furthermore, it is contemplated that data structures embodying the present invention will be transmitted across computer and machine readable media.

The present invention may be described through the use of flowcharts. Often, a single instance of an embodiment of the present invention will be shown. As is appreciated by those of ordinary skill in the art, however, the protocols and procedures described herein may be repeated continuously or as often as necessary to satisfy the needs described herein. Accordingly, the representation of the present invention through the use of flowcharts should not be used to limit the scope of the present invention.

The present invention further relates to devices that embody the P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation were one node corresponds to one device.

Each node may communicate to other nodes in an P1394b-compatible system though links. Typically, a cable is used for a link, as is provided for in the P1394b standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

Figure 5:
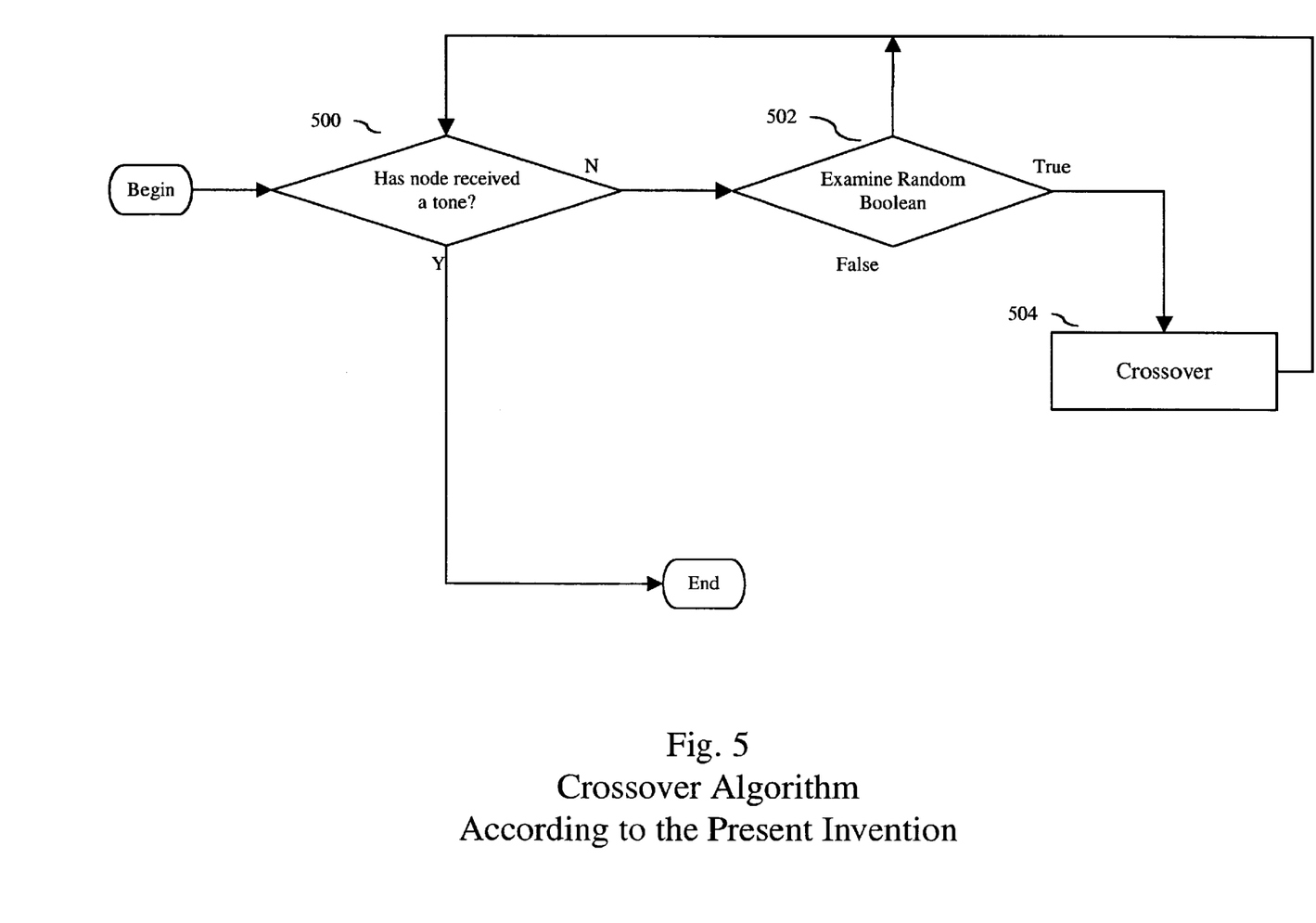
FIG. 5 is a flowchart of a first aspect of a crossover process according to the present invention.

FIG. 5 is a flowchart of a method for automatically healing a crossover according to the present invention. FIG. 5 provides an excellent overview of the present invention. The process begins with act 500 in which a node which wishes to connect to a bus listens for a connect tone.

As is appreciated by those of ordinary skill in the art, P1394b implements a unique joining sequence that is triggered when a PHY is powered up. When a PHY is powered up, it sends out a signal detect tone on the bus. When a PHY is on the bus and hears the signal detect originating from another PHY, the PHYs acknowledge each other and move onto a connection detect stage, and eventually join each other on the bus.

Thus, in query 500 a PHY which wishes to connect to the bus is listening for the signal detect originating from another PHY. If the PHY receives a tone, then the PHY is not suffering from a crossover and therefore must be correctly coupled, and the process ends.

If the PHY does not receive a tone, then there is possibly a crossover that needs to be healed, and the process moves to query 502.

In query 502, the PHY examines a Boolean variable to see whether it should implement a crossover. The Boolean variable is provided to prevent the condition where two PHYs are attempting to heal a crossover at the same time. Any means for generating a random true-false value may be employed in the present invention. In an exemplary non-limiting embodiment of the present invention, the random Boolean generator used for the root node contention algorithm in the P1394b is employed for the present invention.

If a false value is returned in query 502, then the process will return to query 500 to see if it has received a tone. If a true value is returned in query 502, then the process moves to act 504.

In act 504, the port will internally crossover its connection internally by swapping TPA and TPB. The result of this is that, for the duration of the "cross-over healing", the internal transmit logic of the port will use TPA (instead of TPB) and the internal receive logic of the port will use TPB (instead of TPA). Preferred methods for implementing a crossover according to the present invention will be disclosed below.

After the crossover is accomplished in act 504, the process of FIG. 5 repeats by moving back to query 500. If the crossover solved the problem, then a tone should be heard in query 500, and the process of FIG. 5 will end.

Figure 6:
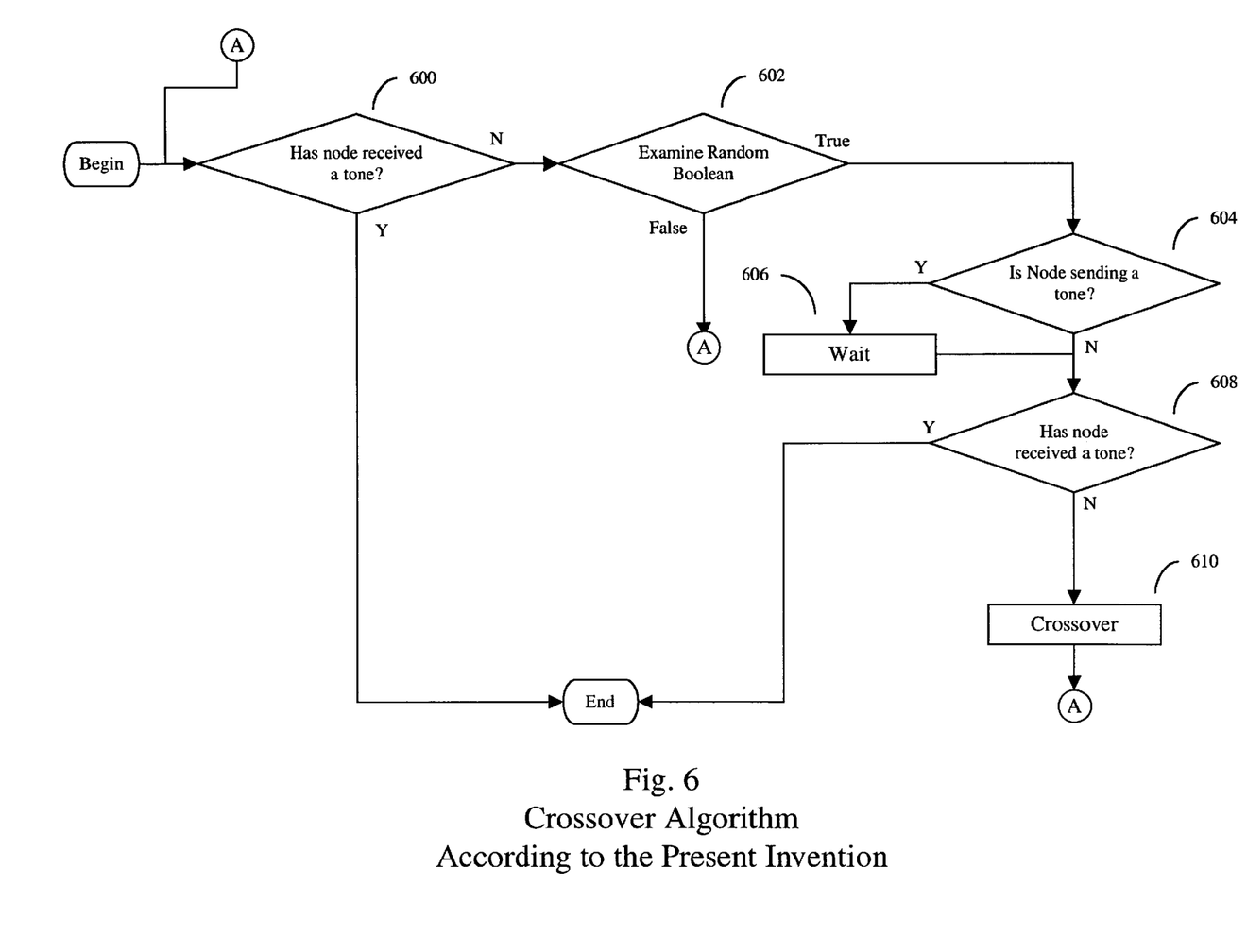
FIG. 6 is a flowchart of a second aspect of a crossover process according to the present invention.

FIG. 6 is a flowchart of another aspect of the present invention. FIG. 6 provides a more detailed embodiment which takes into account contingencies which may occur in actual practice.

In query 600, the PHY which wishes to join listens for a tone. This act is substantially similar to query 500 in FIG. 5, above. If the PHY receives a tone, then the process of FIG. 6 ends as there is no crossover.

If the PHY does not receive a tone, then there is possibly a crossover that needs healing, and the process moves to query 602.

In query 602, the PHY will examine a random Boolean variable. This query is substantially similar to query 502 in FIG. 5, above.

If the result of query 602 is false, then the process of FIG. 6 moves back to query 600 through connector A. If the result of query 602 is true, then the process moves to query 604.

In query 604, the PHY determines whether it is still sending out a tone. As is appreciated by those of ordinary skill in the art, a PHY will send out four tones in P1394b. It is desired that a PHY will not implement a crossover while it is still sending out a tone, as this would result in first part of the tone being transmitted on one pair, and the remaining part of the tone being transmitted on the other pair. Thus, if the PHY is still sending out tones in query 604, then the process will move to act 606 where the PHY will wait for a predetermined amount of time. In an exemplary non-limiting embodiment of the present invention, the PHY will wait in act 606 until it is finished sending out tones.

After the PHY has waited an appropriate amount of time in act 606, or if the PHY is not sending out tones and the result of query 604 is negative, then the process moves to query 608.

Query 608 provides for a safe harbor in case tones have appeared while the PHY was working through the process of FIG. 6. In query 608, the PHY once again checks to see whether it has received a tone. If the PHY has received a tone, then there was no crossover in the first place, and the process of FIG. 6 ends.

If the PHY still has not received a tone, then there is possibly a crossover that requires healing, and the process moves to act 610.

In act 610, the PHY implements a crossover healing process substantially similar to act 504 in FIG. 5. When the PHY has finished the crossover healing of act 610, the process of FIG. 6 will move back to query 600 through connector A to see if the crossover has solved the problem. If the crossover has solved the problem, the a tone should be heard in query 600, and the process of FIG. 6 will end. If not, the process of FIG. 6 will repeat itself.

Figure 7:
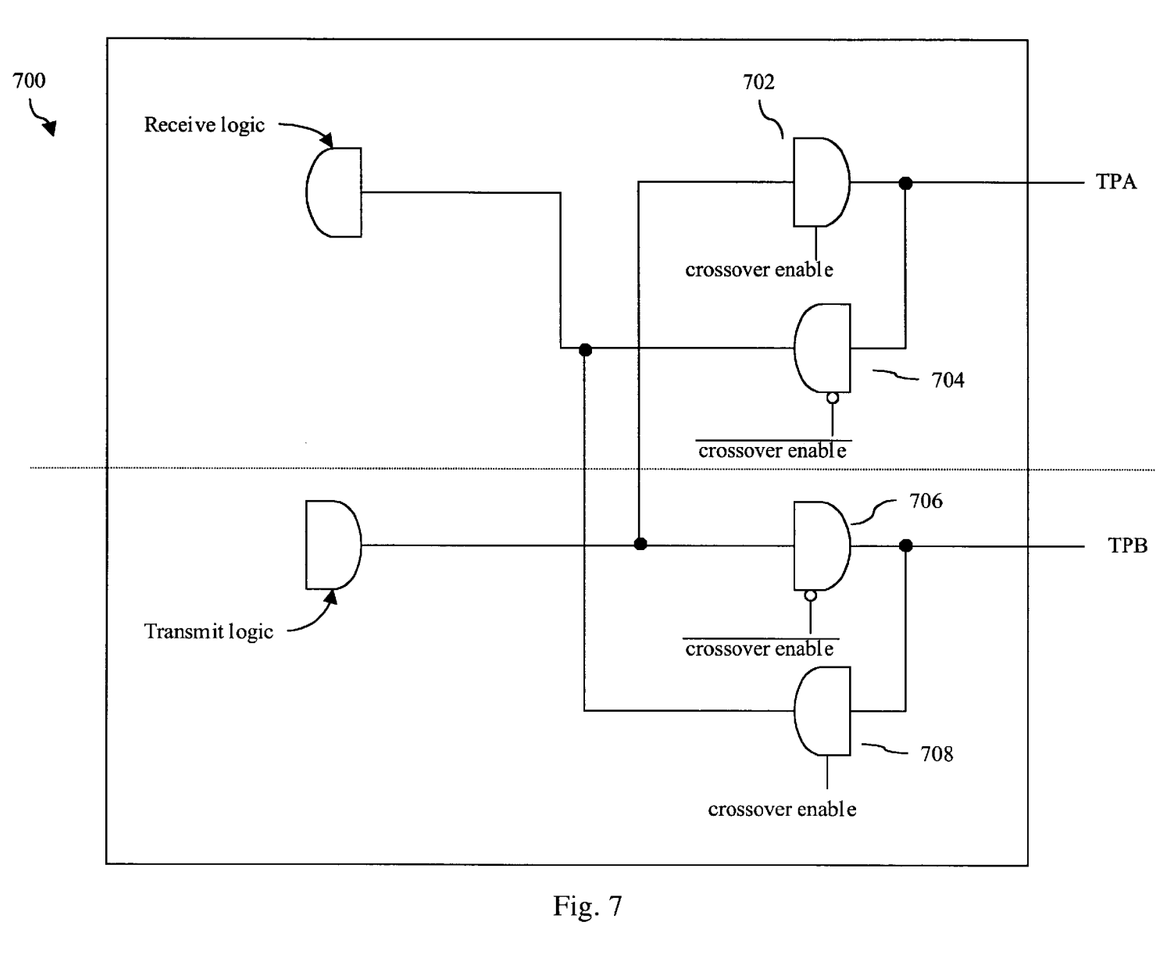
FIG. 7 is a schematic of crossover circuitry according to the present invention.

FIG. 7 is a schematic diagram of crossover logic according to the present invention. FIG. 7 shows a P1394b-compliant port 700 having transmit and receive logic standard in the art for implementing the P1394b standard.

FIG. 7 show the transmit logic couple to connection point TPB through passgate 706. Passgate 706, and all passgates shown in FIG. 7, may be implemented through any means standard in the art, such as a standard parallel CMOS configuration, or a latch. The transmit logic is also coupled to connection point TPA through passgate 702.

The receive logic is coupled to connection point TPA through passgate 704. The receive logic is also coupled to connection point TPB through passgate 708.

A crossover enable signal is provided to passgates 702 and 708. An inverted crossover enable is provided to passgates 704 and 706. It is contemplated that the crossover enable signal may be inverted through any means standard in the art, such as an inverter. In a preferred embodiment of the present invention, the crossover enable signal and the inverted crossover enable signals are provided to the common gate of their respective passgates to provide a means for switching TPA and TPB.

In operation, the crossover enable signal is normally low. As can be seen by inspection of FIG. 7, a low crossover enable signal will couple the receive logic to TPA through passgate 704 which will be on because of the low crossover enable signal being applied. The normally low crossover enable signal will also couple the transmit logic to TPB through passgate 706, which will be on by virtue of the low crossover enable signal applied to it.

In a preferred embodiment of the present invention, the logical state of the crossover enable signal will be determined by the processes disclosed in FIGS. 5 and 6. When the processes of FIGS. 5 and 6 result in a crossover act being required, the crossover enable signal will be brought high by circuitry on the PHY. This circuitry may be any circuitry standard in the art for implementing the P1394b standard and is not shown in FIG. 7.

As can be seen by inspection of FIG. 7, when the crossover enable signal is brought high, passgates 702 and 708 will be turned on, and passgates 704 and 706 will be turned off, thus coupling the receive logic to connection point TPB and coupling the transmit logic to connection point TPA.

Thus, the circuitry of FIG.7, with the processes of FIGS. 5 and 6, provide a simple and effective means for automatically implementing a crossover and eliminates the need for patch cables, and allows the user to connect the system with many different types of patch cords without fear that the system will fail. Thus, with the advantages provided by the present invention, a user may connect a P1394b-compliant system with a cable that employs an internal crossover, or a non-crossover patch cable, and the system will function regardless of which cable the user employs.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a data communications system having a P1394b-compliant bus and a PHY which wishes to join the bus, a method for automatically detecting and healing a crossover comprising:

determining, by the PHY, whether it has received a tone;

if the PHY has not received a tone, then examining a random Boolean value; and if the value of said random Boolean value is true, then implementing, by said PHY, a crossover process.

2. The method of claim 1, wherein said crossover process comprises coupling the transmitting logic of said PHY to TPA, and coupling the receive logic of said PHY to TPB.

3. The method of claim 2, where said system may be operatively coupled with a non-crossover cable.

4. In a data communications system having a P1394b-compliant bus and a PHY which wishes to join the bus, a method for automatically detecting and healing a crossover comprising:

determining, by the PHY, whether it has received a tone;

if the PHY has not received a tone, then examining a random Boolean value;

if the value of said random Boolean value is true, determining, by said PHY, whether said PHY is sending a tone;

if said PHY is sending a tone, then waiting a predetermined period of time;

further determining by said PHY if said PHY has received a tone; and if said PHY has not received a tone, then implementing, by said PHY, a crossover process.

5. The method of claim 4, wherein said crossover process comprises coupling the transmitting logic of said PHY to TPA, and coupling the receive logic of said PHY to TPB.

6. The method of claim 5, where said system may be operatively coupled with a non-crossover cable.

* * * * *

UNITED STATES PATENT AND TRADEMARK OFFICE
CERTIFICATE OF CORRECTION

PATENT NO. : 6,618,785 B1  
DATED : September 9, 2003  
INVENTOR(S) : Colin Whitby-Strevens

Page 1 of 1

It is certified that error appears in the above-identified patent and that said Letters Patent is hereby corrected as shown below:

<u>Title page,</u>
Item [75], Inventor, replace "Colin Whitby-Streves" with
-- Colin Whitby-Strevens --.

Signed and Sealed this

Eleventh Day of November, 2003

JAMES E. ROGAN  
*Director of the United States Patent and Trademark Office*